United States Patent
Wang et al.

(10) Patent No.: US 6,954,838 B2
(45) Date of Patent: Oct. 11, 2005

(54) VIRTUAL COUNTER FOR DATA RATE CONVERSION

(75) Inventors: Wenbao Wang, Ottawa (CA); Kwok Fai Chan, Orleans (CA)

(73) Assignee: Zarlink Semiconductor Inc., Kanata (CA)

( * ) Notice: Subject to any disclaimer, the term of this patent is extended or adjusted under 35 U.S.C. 154(b) by 324 days.

(21) Appl. No.: 10/426,850

(22) Filed: May 1, 2003

(65) Prior Publication Data

US 2004/0019444 A1 Jan. 29, 2004

(30) Foreign Application Priority Data

May 16, 2002 (GB) ............................................. 0211173

(51) Int. Cl.⁷ ......................... G06F 12/00; G06F 19/00
(52) U.S. Cl. ...................... 711/173; 711/154; 711/170; 702/80
(58) Field of Search ............................ 711/100, 154, 711/170, 173; 702/1, 57, 80

(56) References Cited

U.S. PATENT DOCUMENTS

| | | |
|---|---|---|
| 4,945,518 A | 7/1990 | Muramatsu et al. |
| 5,943,328 A | 8/1999 | Hosford |
| 6,233,651 B1 | 5/2001 | O'Neill et al. |
| 6,538,656 B1 * | 3/2003 | Cheung et al. ............. 345/519 |
| 2001/0017850 A1 | 8/2001 | Kalliokulju et al. |
| 2004/0230673 A1 * | 11/2004 | Lange-Pearson et al. ... 709/223 |

FOREIGN PATENT DOCUMENTS

| | | |
|---|---|---|
| JP | 3150944 A | 10/1991 |
| JP | 2003069629 A | 3/2003 |

* cited by examiner

*Primary Examiner*—Tuan V. Thai
(74) *Attorney, Agent, or Firm*—Marks & Clerk; S. Mark Budd

(57) ABSTRACT

A virtual counter for dynamically calculating memory addresses at a digital switch that receives data streams of different data rates. The switch has a memory that is divisible into partitions with each partition being divisible into multiple locations. A virtual counter is implemented for each data stream in a rate conversion architecture at the switch to optimize usage of the switch memory. An input virtual counter is used to calculate a data memory address and an output virtual counter is used to calculate a connection memory address.

17 Claims, 3 Drawing Sheets

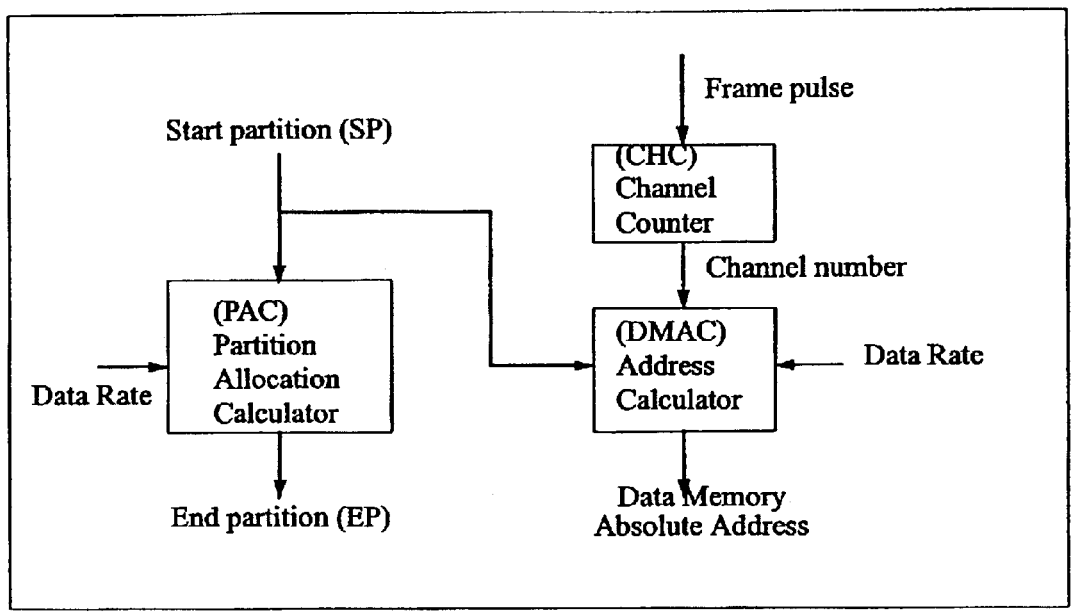
Figure 1: Input Virtual Counter

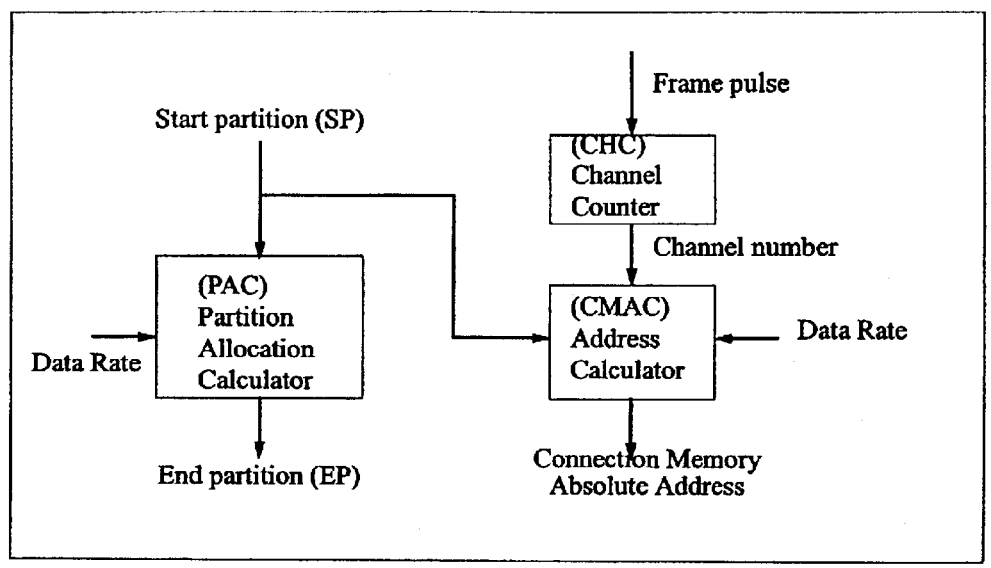
Figure 2: Output Virtual Counter

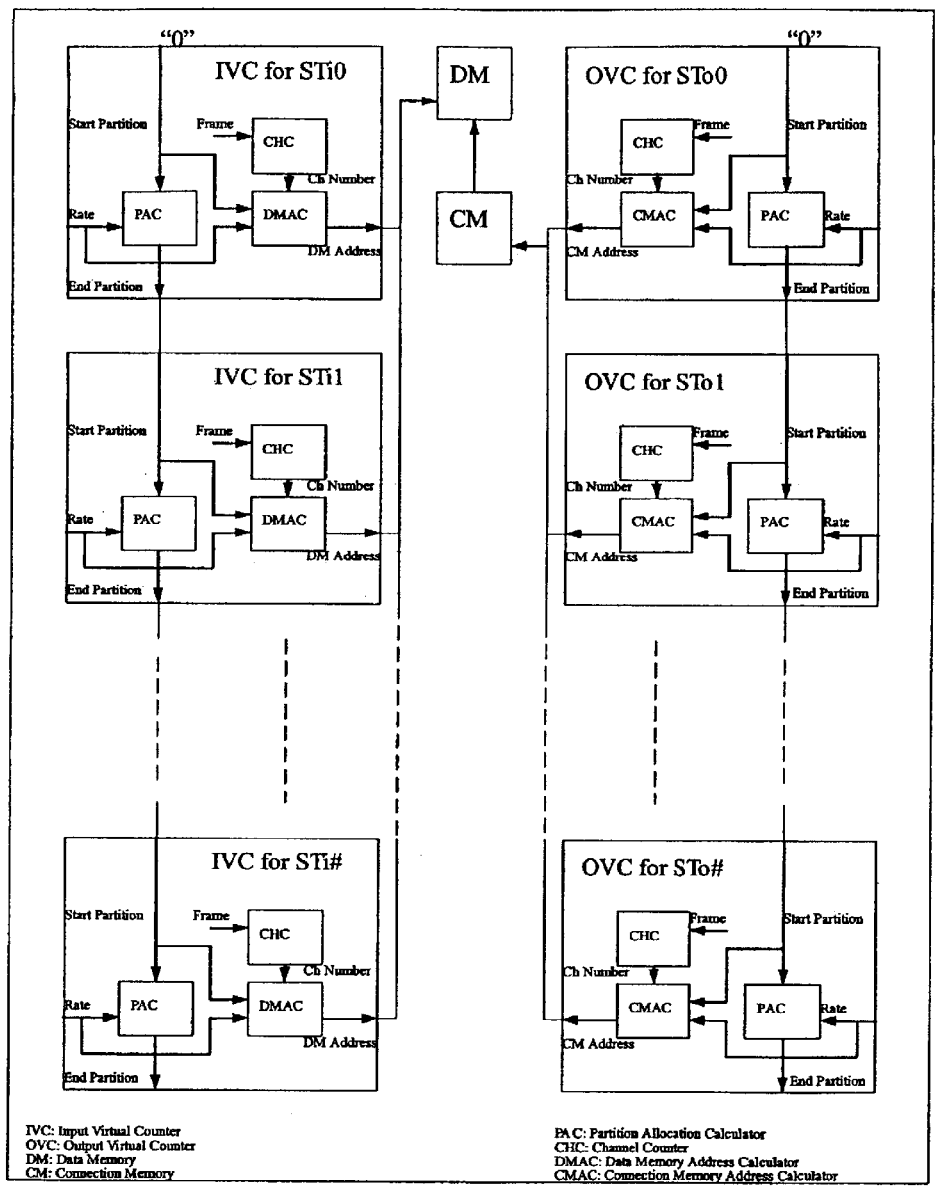
Figure 3: Virtual Counters for Rate Conversion

VIRTUAL COUNTER FOR DATA RATE CONVERSION

FIELD OF THE INVENTION

This invention relates to time slot interchange switching also known as TDM switching which typically uses time domain multiplex (TDM) serial streams and memory to implement a switch. This invention, in particular, provides a system and method for accommodating serial streams of variable data rates.

BACKGROUND OF THE INVENTION

TDM serial streams often have to be synchronized with each other for correct operation. Typical synchronizing timing signals employed in TDM switching is an 8 kHz timing signal also referred to as a frame pulse. Typically, every 8 bits makes up one channel and each serial stream has a fixed number of channels every frame (125 microseconds). For example, 2.048 Mb/s stream has 32 channels per frame and 8.192 Mb/s stream has 128 channels per frame. Usually, all channels of one frame need to be stored into internal memory so that the data can be switched on a per frame basis (8 kHz).

Because multiple data rates are typically employed for TDM streams such as 2.048 Mb/s, 4.096 Mb/s, 8.192 Mb/s, 16.384 Mb/s, 32.768 Mb/s and even higher rates, rate conversion switches are required to convert data between different data rates. The prior art method of performing rate conversion is to reserve the maximum number of memory locations for the stream having the highest data rate of all of the streams which appear at the switch. Thus, if data streams having a range of rates from, for example, 2.048 Mb/s to 16.384 Mb/s, 256 memory locations per frame would need to be reserved. Thus when a 2.048 Mb/s data stream is received requiring only 32 channels the high number of reserved locations leads to wasted memory. This results in a low efficiency of memory usage and it will be apparent from the above that the higher the data rate the less efficient the memory usage will be.

The present invention overcomes the memory waste problem by allocating memory addresses dynamically by using a virtual counter. In this way the full switching bandwidth provided by the internal memory can always be available no matter what data rate is employed.

SUMMARY OF THE INVENTION

It is an object of the present invention to provide dynamic absolute memory addresses for data streams with different input and output data rates without wasting any memory location while the data rates of the input and output data streams can be programmable. The feature is applicable to both data memory and connection memory.

According to the invention the creation of the absolute memory address virtual counter maximizes the memory usage on silicon. It minimizes the device die size and reduces the manufacturing cost while allowing the device to provide the maximum number of data switching channels.

Therefore, in accordance with a first aspect of the present invention a virtual counter for dynamically calculating a memory address at a digital switch, the switch having a memory divisible into partitions, each of the partitions being divisible into multiple locations, the virtual counter comprising: a partition calculator to calculate the number of memory partitions required for a given time interval; a location counter to count the number of partition locations occupied during said time interval; and an address allocation calculator to obtain an absolute memory address based on partition and location information.

In accordance with a second aspect of the present invention there is provided a method of dynamically calculating a memory address at a digital switch, the digital switch having a memory structure divisible into partitions with each partition divisible into multiple locations, the method comprising: calculating the number of memory partitions required for a given time interval using a partition calculator; counting the number of partition location occupied during the time interval using a location counter; and obtaining an absolute memory address based on partition and location information using an address allocation calculator.

In accordance with a further aspect of the present invention there is provided a rate conversion circuit for use in a digital switch that receives input data streams of different data rates, the switch having a memory divisible into partitions, each of partitions being divisible into multiple locations, the rate conversion circuit comprising: a virtual counter for calculating a memory address at digital switch, the virtual counter having a partition calculator to calculate the number of memory partitions required for a given time interval; a location counter to count the number of partition location occupied during said time interval; and an address allocation calculator to obtain an absolute memory address based on partition and location information.

BRIEF DESCRIPTION OF THE DRAWINGS

The invention will now be described in greater detail with reference to the attached drawings wherein:

FIG. 1 is a block diagram of an input virtual counter;

FIG. 2 is a block diagram of an output virtual counter; and

FIG. 3 is a top level block diagram of multiple virtual counters in a rate conversion implementation.

DETAILED DESCRIPTION OF THE EMBODIMENT

To make full use of memory resources available in a data switch each serial stream should reserve memory locations to the least possible extent based on the data rate specified for that particular stream. For different data rates the total number of channels within one frame (125 microseconds) is different. A 2.048 Mb/s rate has 32 channels, a 4.096 Mb/s rate has 64 channels, a 8.192 Mb/s rate has 128 channels, a 16.384 Mb/s stream has 256 channels and so on. In order to deal with different data rates the present invention utilizes a virtual counter circuit for each stream to calculate the absolute memory address for each channel dynamically.

FIG. 1 is a block diagram of an input virtual counter according to the present invention. Each input stream has one input virtual counter circuit associated with it. The start partition is the first memory partition allocated to one particular stream and the end partition is the partition at which partition allocation stops. As will be discussed later the end partition actually is a start position of the next stream. In FIG. 1 the partition allocation calculator analyzes the data rate of the data stream and determines how many partitions are required to store one frame of the data stream based on the data rate of that stream. For example, a 2.048 Mb/s stream requires one partition while a 16.384 Mb/s stream requires 8 partitions. Table 1 below shows the relationship between data rate and number of partitions required.

TABLE 1

Data Rate and Partitions

| Stream Data Rate | Number of Partition required | Number of Channel Assigned |
|---|---|---|
| 2.048 Mb/s | 1 | 32 |
| 4.096 Mb/s | 2 | 64 |
| 8.192 Mb/s | 4 | 128 |
| 16.384 Mb/s | 8 | 256 |
| 32.768 Mb/s | 16 | 512 |
| 65.536 Mb/s | 32 | 1024 |

Each partition has 32 locations or channels. The channel counter counts the number of channels that have been stored during the frame. The channel number determined by the channel counter is fed to the data memory absolute address calculator which also receives information regarding the data rate of the input signal. As indicated previously the start partition is the first memory partition allocated to one particular stream and the end position is the partition at which the partition allocation stops. Stream O as a start position fixed to zero and the rest of the stream's start partition is the end partition which is passed from the previous stream. The end partition is calculated as follows:

$$EP=SP+N$$

where EP=end partition number
SP=start partition number (0 for the first stream)
N=number of partitions required
For 2.048 Mb/s stream, N=1
For 4.096 Mb/s stream, N=2
For 8.192 Mb/s stream, N=4
For 16.384 Mb/s stream, N=8
For 32.768 Mb/s stream, N=16
For 65.536 Mb/s stream, N=32

The channel number is generated from the counter which is reset to zero at the frame boundary where the frame boundary is defined by the frame pulse. The channel number is incremented by one for every channel.

The data memory's absolute address is the physical address in the memory that one particular channel would be written into. The data memory absolute address is generated as follows:

$$A_{dm}=L*N*SP+C-O$$

Where
$A_{dm}$=data memory's absolute address
L=total number of locations of one partition, which is 32.
N=number of partitions required
SP=start partition number
C=channel number
O=channel offset in terms of number of channels Each output stream also has one output virtual counter associated with it. The output virtual counter wich is very similar to the input virtual counter is illustrated in FIG. 2. The start partition and channel numbers are defined in the same manner as those of the input virtual counter. In the case of the output virtual counter, however, the address output is for connection memory instead of data memory. The connection memory's absolute address is generated as follows:

$$A_{cm}=L*N*SP+C+O$$

Where
$A_{cm}$=connection memory's absolute address
L=total number of locations of one partition, which is 32.
N=number of partitions required
SP=start partition number
C=channel number
O=channel offset in terms of number of channels It will be apparent to one skilled in the art that the input and output virtual counters find a particular implementation in a rate conversion architecture which is shown in the block diagram of FIG. 3. As indicated previousy the input virtual counter provides absolute address for the data memory while the output virtual counter provides the absolute address for the connection memory. Both are independent of each other.

Working with the virtual counters, the internal memories, including data memory and connection memory are managed in partitions and each partition holds 32 locations which is the minimum requirement of one 2.048 Mb/s. Thus each 2.048 Mb/s takes one memory partition and streams with other data rates higher than the base 2.048 Mb/s take multiple memory partitions.

The virtual counters calculate the number of partitions required for each stream based on its data rate and allocates memory location for each channel. Tables 2, 3 and 4 illustrate the number of partitions and the channel numbers for different data rates.

TABLE 2

Partitions and channel number (data rate = 2.048 Mb/s)

| Partition | Channel Number |
|---|---|
| SP | 0  1  2  3  4  5  6  7  8  9  10  11  12  13  14  15 |
|    | 16 17 18 19 20 21 22 23 24 25 26 27 28 29 30 31 |

EP = SP + 1

TABLE 3

Partitions and channel number (data rate = 4.096 Mb/s)

| Partition | Channel Number |
|---|---|
| SP | 0  1  2  3  4  5  6  7  8  9  10 11 12 13 14 15 |
|    | 16 17 18 19 20 21 22 23 24 25 26 27 28 29 30 31 |
| SP + 1 | 32 33 34 35 36 37 38 39 40 41 42 43 44 45 46 47 |
|    | 48 49 50 51 52 53 54 55 56 57 58 59 60 61 62 63 |

EP = SP + 2

TABLE 4

Partitions and channel number (data rate = 8.192 Mb/s)

| partition | Channel Number | | | | | | | | | | | | | | | |
|---|---|---|---|---|---|---|---|---|---|---|---|---|---|---|---|---|
| SP | 0 | 1 | 2 | 3 | 4 | 5 | 6 | 7 | 8 | 9 | 10 | 11 | 12 | 13 | 14 | 15 |
|  | 16 | 17 | 18 | 19 | 20 | 21 | 22 | 23 | 24 | 25 | 26 | 27 | 28 | 29 | 30 | 31 |
| SP + 1 | 32 | 33 | 34 | 35 | 36 | 37 | 38 | 39 | 40 | 41 | 42 | 43 | 44 | 45 | 46 | 47 |
|  | 48 | 49 | 50 | 51 | 52 | 53 | 54 | 55 | 56 | 57 | 58 | 59 | 60 | 61 | 62 | 63 |
| SP + 2 | 64 | 65 | 66 | 67 | 68 | 69 | 70 | 71 | 72 | 73 | 74 | 75 | 76 | 77 | 78 | 79 |
|  | 80 | 81 | 82 | 83 | 84 | 85 | 86 | 87 | 88 | 89 | 90 | 91 | 92 | 93 | 94 | 95 |
| SP + 3 | 96 | 97 | 98 | 99 | 100 | 101 | 102 | 103 | 104 | 105 | 106 | 107 | 108 | 109 | 110 | 111 |
|  | 112 | 113 | 114 | 115 | 116 | 117 | 118 | 119 | 120 | 121 | 122 | 123 | 124 | 125 | 126 | 127 |

EP = SP + 4

Note: SP = Start Partition; EP = End partition

As will be apparent from FIG. 3 that data stream zero is fed to the virtual counter STi0 and each of the remaining data streams will be fed to the other virtual counters in the architecture shown in FIG. 3. Each receives the serial data stream and outputs the absolute memory address for the data.

The output virtual counters provide the connection memory address for the output streams.

While particular embodiments of the invention have been described and illustrated it will be apparent to one skilled in the art that numerous changes can be made without departing from the basic concept. It is to be understood, however, that such changes will fall within the scope of the invention as defined solely by the appended claims.

What is claimed is:

1. A virtual counter for dynamically calculating a memory address at a digital switch, the switch having a memory divisible into partitions, each of said partitions being divisible into multiple locations, the virtual counter comprising:
   a partition calculator to calculate the number of memory partitions required for a given time interval;
   a location counter to count the number of partition locations occupied during said time interval; and
   an address allocation calculator to obtain an absolute memory address based on partition and location information.

2. The virtual counter as defined in claim 1 wherein the given time interval is one frame at a predetermined timing signal rate.

3. The virtual counter as defined in claim 2 wherein said timing signal rate is 8 kHz.

4. The virtual counter as defined in claim 2 wherein said partition and location information is based on the data rate of a data stream to said switch.

5. The virtual counter as defined in claim 4 for receiving an incoming data stream and for calculating an absolute data memory address.

6. The virtual counter as defined in claim 4 for receiving an output data stream and for calculation an absolute connection memory address.

7. The virtual counter as defined in claim 1 wherein said partition calculator records a start partition flag.

8. The virtual counter as defined in claim 7 wherein said partition calculator records an end partition flag.

9. The virtual counter as defined in claim 8 wherein said partition calculator has means to pass said end partition flag to another virtual counter.

10. A method of dynamically calculating a memory address at a digital switch, the digital switch having a memory structure divisible into partitions with each partition divisible into multiple locations, the method comprising:
    calculating the number of memory partitions required for a given time interval using a partition calculator;
    counting the number of partition location occupied during said time interval using a location counter; and
    obtaining an absolute memory address based on partition and location information using an address allocation calculator.

11. The method as defined in claim 10 wherein said time interval is 125 $\mu$secs being one frame of an 8 kHz timing signal.

12. The method as defined in claim 11 wherein the number of partitions and location for each partition is based on the data rate of an incoming data stream.

13. The method as defined in claim 12 wherein for a data rate of 2.048 Mb/s one partition is required and the number of partitions doubles with a doubling of the data rate.

14. The method as defined in claim 13 wherein each partition has 32 locations.

15. A rate conversion circuit for use in a digital switch that receives input data streams of different data rates, the switch having a memory divisible into partitions, each of said partitions being divisible into multiple locations, the rate conversion circuit comprising:
    a virtual counter for calculating a memory address at said digital switch, the virtual counter having a partition calculator to calculate the number of memory partitions required for a given time interval; a location counter to count the number of partition location occupied during said time interval; and an address allocation calculator to obtain an absolute memory address based on partition and location information.

16. The rate conversion circuit as defined in claim 15 implemented in each data stream for dynamically calculating an absolute memory address for each data stream, wherein each data stream may have a different data rate.

17. The rate conversion circuit as defined in claim 16 wherein an end partition value calculated at the virtual counter for a first data stream is supplied to the virtual counter of a subsequent virtual counter as a start partition value.

* * * * *